United States Patent [19]

Iyoda et al.

[11] 4,427,986

[45] Jan. 24, 1984

[54] METHOD OF CHARGING JETTED INK DROPS

[75] Inventors: Tetsuo Iyoda; Masayoshi Tamai, both of Ebina, Japan

[73] Assignee: Fuji Xerox Co., Ltd., Tokyo, Japan

[21] Appl. No.: 344,689

[22] Filed: Feb. 1, 1982

[30] Foreign Application Priority Data

Apr. 17, 1981 [JP] Japan ................................ 56-57942

[51] Int. Cl.[3] ...................... G01D 15/18; G01D 18/00

[52] U.S. Cl. ........................................ 346/1.1; 346/75

[58] Field of Search ........................... 346/1.1, 75, 140

[56] References Cited

U.S. PATENT DOCUMENTS

| | | | |
|---|---|---|---|
| 3,769,627 | 10/1973 | Stone | 346/75 |
| 3,789,422 | 1/1974 | Haskell et al. | 346/75 |
| 3,828,354 | 8/1974 | Hilton | 346/1.1 |
| 3,833,910 | 9/1974 | Chen | 346/1.1 |
| 3,969,733 | 7/1976 | De Moss et al. | 346/1.1 |
| 4,223,321 | 9/1980 | Kenworthy | 346/75 |
| 4,314,259 | 2/1982 | Cairns et al. | 346/75 |

*Primary Examiner*—Donald A. Griffin

*Attorney, Agent, or Firm*—Sughrue, Mion, Zinn, Macpeak and Seas

[57] ABSTRACT

A confrontation type charging electrode member is disposed below or above flying paths of ink drops generated by a multi-nozzle jet in order to charge the ink drops in a binary type multi-nozzle ink jet printer. The electrodes apply a guard voltage to guard drops in front of and behind as well as on each side of printing drops so that the printing drops can move straight thereby reducing cross-talk between drops.

7 Claims, 7 Drawing Figures

METHOD OF CHARGING JETTED INK DROPS

BACKGROUND OF THE INVENTION

1. Field of the Invention

This invention relates to a method of increasing the density of charging electrodes in a multi-nozzle ink jet printer in which continuously formed ink drops are selectively charged to perform a printing operation and to a method of correcting the amount of charge which is required in association with the increase of the charging electrode density.

2. Description of the Prior Art

In a conventional charge-control type or binary type multi-nozzle ink jet printer, the charging electrode member adapted to charge ink drops which are formed thereby is as shown in FIGS. 1 or 2. In order to prevent cross-talk due to adjacent ones of the electrodes which form the electrode member, it is necessary to electrostatically shield the positions where the ink drops are separated. In order to meet this requirement, the conventional electrode member is so formed that the electrodes surround the ink drops. However, the configuration of the electrode member is one of the factors which limits increasing the electrode density which is required in order to increase the operating speed and the resolution. Especially in the binary type multi-nozzle ink jet printer, the fluctuation in the amount of charge of charged ink drops will cause no trouble if the amounts of charge are more than a certain value. However, printing distortion is caused by fluctuations in the amount of charge of printing drops (i.e., non-charged drops) which is caused by cross-talk.

SUMMARY OF THE INVENTION

An object of the present invention is to eliminate the above-described drawbacks accompanying a conventional multi-nozzle ink jet printer. More specifically, an object of the invention is to increase the resolution in an ink jet system, and to eliminate the cross-talk between ink drops.

According to the invention, a charging electrode member is disposed in such a manner that electrodes forming the charging electrode member are set above or below a plurality of ink drop flying paths so that guard voltages are applied not only to ink drops on both sides of a printing ink drop but also to ink drops before and behind the printing ink drop and a negative voltage is applied to the printing ink drop.

In this case, sometimes an ink drop adjacent to the printing drop is employed as a printing drop. This can be achieved by increasing an ink drop generating frequency to several times of a present necessary ink drop generating frequency.

DESCRIPTION OF THE PREFERRED EMBODIMENTS

The invention will be described with reference to FIGS. 3 through 7.

Figure 1:
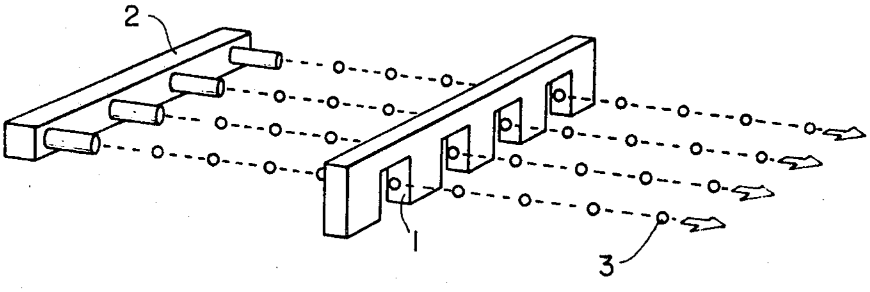
FIG. 1 PRIOR ART
FIG. 1 is a perspective view showing one example of a conventional charging electrode member.
Figure 2:
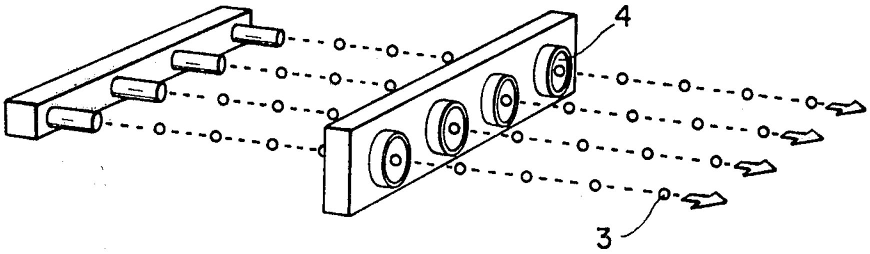
FIG. 2 PRIOR ART
FIG. 2 is a perspective view showing another example of the conventional charging electrode member.
Figure 3:
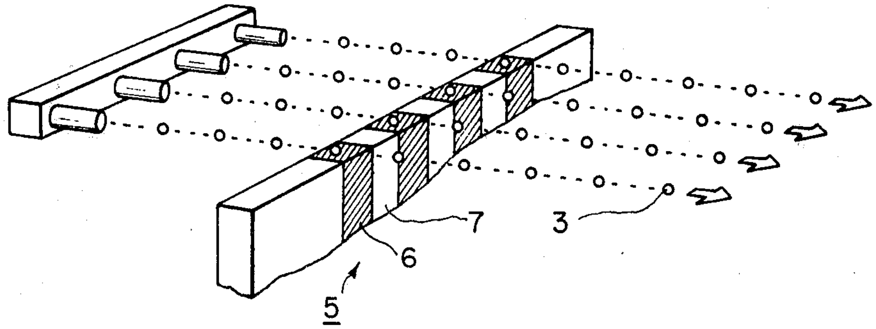
FIG. 3 is a perspective view showing one example of a confrontation type charging electrode member according to the present invention.

In the embodiment of FIG. 3 of the invention, a metal electrode member 5 is disposed perpendicularly to the flying paths of ink drops 3 which are jetted in a plurality of lines, so that a guard voltage is applied to ink drops **3*g* on both (right and left) sides of an ink drop 3, and a guard voltage is applied to ink drops 3*fg* and 3*bg* in front of and behind the ink drop 3** as described later, and a negative voltage is applied to printing drops.

The term "ink drops in front of and behind an ink drop" is intended to mean the ink drops which are located in front of and behind a particular ink drop in the flying direction (hereinafter referred to as "front and rear drops", when applicable). The term "ink drops on both sides of an ink drop" is intended to mean the ink drops which are adjacent to the particular ink drop and are located perpendicularly to the flying direction (hereinafter referred to as "right and left drops", when applicable).

Figure 4:
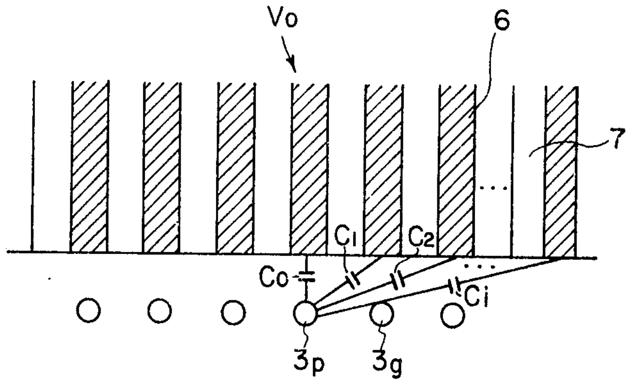
FIG. 4 is an explanatory diagram showing the positional relationships between the electrode member of the invention and ink drops.

In this embodiment, the metal electrode member 5 is made up of an insulating substrate 7 with metal electrodes 6 formed on the insulating substrate 7, as shown in FIGS. 3 and 4. In FIG. 4, reference character **3*p* designates a printing drop and 3*g* designates a guard drop to which the guard voltage is applied. The printing drop 3*p* has a guard drop 3*g*** on each side. In the metal electrode member thus constructed, the amount of charge can be represented by the following expression:

$$Q_i = C_iV_i + C_{i+1}(V_{i-1} + V_{i+1}) + C_{i+2}(V_{i-2} + V_{i+2}) + \ldots = \sum_{j=1}^{N} C_{j-i} V_j$$

where $C_i$ is the capacitance between a particular drop and the i-th electrode from the particular drop, $Q_i$ is the amount of charge, and $V_i$ is the voltage of the i-th electrode.

In these expressions, $C_i > C_{i+1} > C_{i+2}$. In the embodiment, $C_{i+1}$ is about 10% of $C_i$, but $C_{i+2}$ is smaller than 1% of $C_i$. Therefore, if $C_{i+2}$ and those smaller than $C_{i+2}$ are disregarded, then:

$$Q_i = C_iV_i + C_{i+1}(V_{i-1} + V_{i+1})$$

since for the printing drop in question $V_i = 0$, the expression can be rewritten as follows:

$$Q_i = C_{i+1}(V_{i-1} + V_{i+1})$$

Figure 5:
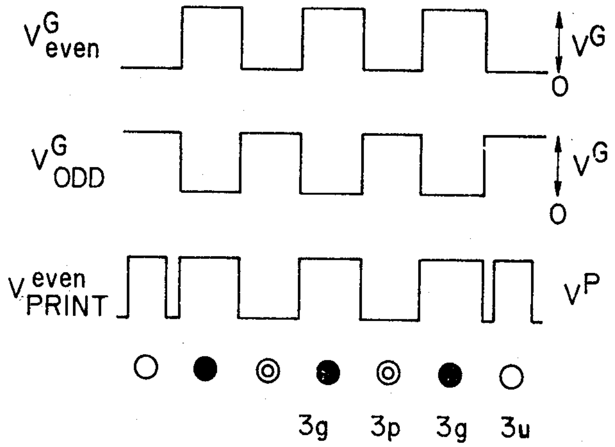
FIG. 5 is one example of a charge control timing chart.

If this is constant, then the printing position is stabilized independently of an image data pattern. Accordingly, $V_{i-1} = V_{i+1} = V^{Guard} = V^G$ ($\approx$ charge voltage) is employed in this invention. This can be realized without decreasing a picture element density by alternately employing odd-number and even-number ink drops as shown in FIG. 5. In practice, this can be achieved by applying a voltage which is the sum of the guard voltage $V^G$ and the printing voltage $V^P$.

In FIG. 5, reference symbol ◉ designates an ink drop deflected by the guard voltage; ○ designates an ink drop to be used for printing; and ⊙ designates an ink drop which is practically used for printing in this example.

The ink drops at opposite ends have the amounts of charge $Q_N=C_1V_{N-1}$ and $Q_1=C_1V_2$, respectively and it is preferable that these amounts of charge are not greatly different from those of the other ink drops. Therefore, the ink drops at both ends are not used for printing and are applied with the guard voltage $V^G$ at all times. Since the printing timing of the odd-number and even-number drops is shifted as much as one clock pulse, it is necessary to apply printing data with this difference taken into account.

Figure 6:
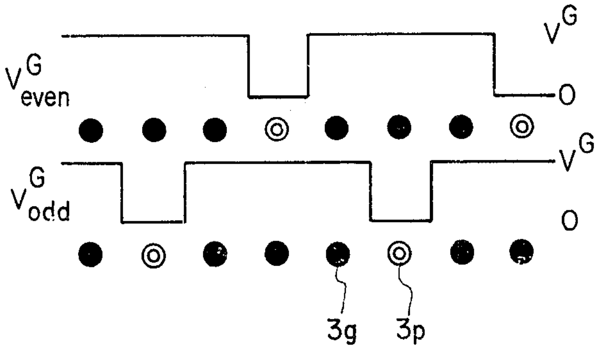
FIG. 6 is another example of the charge control timing chart.

In the case where a printing drop is charged by induction from the front drop array (which is the adjacent drop array which has been separated immediately before) to an unallowable extent, control should be made as indicated by a timing chart in FIG. 6. The amount of charge in this case is:

$$Q_i = 2C_1 V^G - (C_0{}^I + 2C_1{}^I)V^G$$

$$= (2C_1 - C_0{}^I - 2C_1{}^I)V^G$$

where an amount of induction is represented by $C_i{}^I$. (In this case also, $C_2{}^I$ and those smaller than that are omitted, and I designates the front drop array of a particular drop array).

Figure 7:
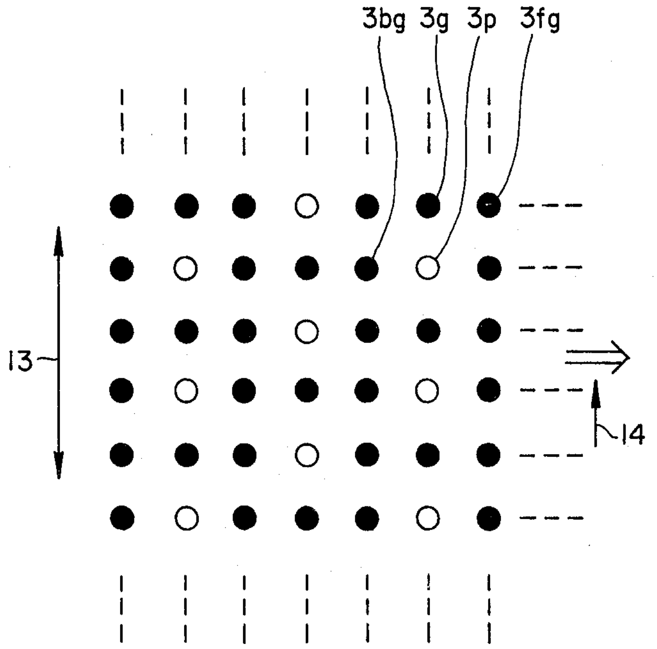
FIG. 7 is an explanatory diagram showing the arrangement of an ink drop pattern.

Thus, the amount of charge is stable and small. One example of the arrangement of ink drops in this case is as shown in FIG. 7. More specifically, each printing drop is surrounded by the charged guard drops, and therefore the amount of charge on the printing drops is stable.

The amount of charge $Q_i=C_1(V_{i-1}+V_{i+1})$ of a printing drop is obtained with $V_i=0$. If $V_i=-v$ (with $V_{i-1}=V_{i+1}=V^G$), then $$Q_i=2C_1V^G-C_0v$$

Therefore, if v is made so as to be represented by the following expression, then $Q_i=0$ can be obtained.

$$v = -\frac{2C_1}{C_0} V^G$$

Accordingly, the printing drop can be moved in a straight line and therefore the printing distortion due to the aerial resistance can be reduced. In the embodiment shown in FIGS. 6 and 7, the corresponding v is represented by the following expression:

$$v = -\frac{1}{C_0}(2C_1 - C_0{}^I - 2C_0{}^I)V^G$$

As is apparent from the above description, according to the invention, the printing drop **3*p* can move in a straight line without being affected by the charged drops on both sides, as shown in FIG. 5. Furthermore, as shown in FIG. 7, each printing drop is surrounded by the front drop 3*fg* and the rear drop 3*bg***. It is therefore free from the cross-talk between drops, which permits an accurate printing operation. In the conventional method using the comb-shaped electrode member or the apertured electrode member for allowing ink particles to pass through the surrounding electrodes, the resolution is of the order of 6 lines/mm. On the other hand, according to the invention, the resolution can be increased to 10 to 12 lines/mm. Another advantage of the invention is that the electrode assembly can be readily manufactured when compared with that in the conventional method.

We claim:

1. A charging method for a binary type multi-nozzle ink jet printer, comprising the steps of:

disposing a confrontation type charging electrode member only on one side of a plane defined by flying paths of separate ink drops separately jetted by a multi-nozzle ink jet so that spaced apart electrodes forming said electrode member confront said ink drops but are spaced away from said ink drops; and applying a guard voltage to first and second ink drops located on both sides of a printing ink drop, said first and second ink drops and said printing ink drop being located on a line traverse to said flying paths.

2. The method claimed in claim 1, further comprising the step of applying said guard voltage to third and fourth ink drops located in front of and behind said printing ink drop, said third and fourth ink drops being located on a flying path along which said printing drop flies.

3. The method claimed in claim 1 or 2 further comprising the step of applying a negative voltage to said printing ink drop.

4. The method claimed in claim 3 further comprising the step of alternatively generating odd and even number printing ink drops.

5. The method claimed in claim 3 wherein said electrode member comprises an insulating substrate having metal electrodes formed on said insulating substrate.

6. The method as claimed in claim 2, further comprising the step of applying a guard voltage to fifth, sixth, seventh and eighth ink drops located diagonally adjacent said printing ink drop, said fifth and sixth ink drops being located on a second line traverse to said flying paths which includes said third ink drop, said seventh and eighth ink drops being located on a third line traverse to said flying paths which include said fourth ink drop.

7. The method as claimed in claim 1, wherein an amount of said guard voltage is determined so as to compensate for cross-talk voltages tending to be applied to said printing ink drop from electrodes that are diagonally disposed from said plane from a point therein defined by said printing ink drop.

* * * * *